US012626128B2

(12) United States Patent
Zappella et al.

(10) Patent No.: US 12,626,128 B2
(45) Date of Patent: May 12, 2026

(54) CONTINUAL MACHINE LEARNING IN A PROVIDER NETWORK

(71) Applicant: Amazon Technologies, Inc., Seattle, WA (US)

(72) Inventors: Giovanni Zappella, Berlin (DE); Lukas Stefan Balles, Berlin (DE); Beyza Ermis, Berlin (DE); Martin Wistuba, Salzkotten (DE); Cedric Philippe Archambeau, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 805 days.

(21) Appl. No.: 17/937,319

(22) Filed: Sep. 30, 2022

(65) Prior Publication Data

US 2024/0112011 A1     Apr. 4, 2024

(51) Int. Cl.
*G06N 3/08*          (2023.01)
*G06F 11/34*         (2006.01)
*G06N 5/04*          (2023.01)

(52) U.S. Cl.
CPC ........... *G06N 3/08* (2013.01); *G06F 11/3409* (2013.01); *G06N 5/04* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | |
|---|---|---|---|
| 11,544,494 B2 * | 1/2023 | Agrawal | ............... G06F 18/217 |
| 11,556,826 B2 * | 1/2023 | Bui | ...................... G06F 18/2413 |
| 2018/0314982 A1 * | 11/2018 | Gopalan | ............... G06N 20/00 |
| 2023/0032585 A1 * | 2/2023 | Jeuk | ........................ H04L 41/12 |
| 2023/0077527 A1 * | 3/2023 | Sarkar | ............... G06Q 10/0635 |
| | | | 705/7.28 |
| 2024/0378247 A1 * | 11/2024 | Kelly | .................... G06F 16/355 |
| 2025/0124298 A1 * | 4/2025 | Ebrahimi | ............. G06N 3/0985 |
| 2025/0148472 A1 * | 5/2025 | Ur | .......................... G06Q 20/12 |

FOREIGN PATENT DOCUMENTS

WO          2022/039748 A1     2/2022

OTHER PUBLICATIONS

International Search Report and Written Opinion, PCT App. No. PCT/US2023/033746, Jan. 23, 2024, 9 pages.

(Continued)

*Primary Examiner* — Hung D Le
(74) *Attorney, Agent, or Firm* — Nicholson De Vos Webster & Elliott LLP

(57)          ABSTRACT

A system and method for continual learning in a provider network. The method is configured to implement or interface with a system which implements a semi-automated or fully automated architecture of continual machine learning, the semi-automated or fully automated architecture implementing user-configurable model retraining or hyperparameter tuning, which is enabled by a provider network. This functions to adapt a model over time to new information in the training data while also providing a user-friendly, flexible, and customizable continual learning process.

19 Claims, 9 Drawing Sheets

(56)                 References Cited

OTHER PUBLICATIONS

Boschini et al., "Class-Incremental Continual Learning into the Extended DER-verse", arXiv.2201.00766v2, Sep. 19, 2022, pp. 1-23.

Buzzega et al., "Dark Experience for General Continual Learning: a Strong, Simple Baseline", 34th Conference on Neural Information Processing Systems (NeurIPS 2020), Oct. 22, 2020, pp. 1-24.

Lomonaco et al., "Avalanche: an End-to-End Library for Continual Learning", arXiv:2104.00405v1, Apr. 1, 2021, pp. 1-11.

Szafranek, Krzysztof, "Zalando's Machine Learning Platform", Zalando Engineering Blog, Apr. 19, 2022, pp. 1-8.

Xu et al., "Mixture of basis for interpretable continual learning with distribution shifts", arXiv.2201.01853v1, Jan. 5, 2022, pp. 1-19.

Zhang et al., "Class-incremental Learning via Deep Model Consolidation", arXiv.1903.07864v4 [cs.CV], Jan. 16, 2020, 15 pages.

Office Action, EP App. No. 23793542.4, Sep. 12, 2025, 06 pages.

Perron et al., "Amazon SageMaker Automatic Model Tuning: Scalable Cradient-Free Optimization", Jun. 18, 2021, 10 pages.

* cited by examiner

200

REGISTERING A TARGET MODEL IN A MODEL REGISTRY S202

SENDING A MODEL UPDATING SIGNAL S204

RECEIVING A COMMAND TO TRIGGER A MODEL UPDATING PIPELINE S206

RETRAINING THE TARGET MODEL  S210

AT LEAST
ONE OF

TUNING HYPERPARAMETERS S220

REGISTERING THE NEW VERSION OF THE TARGET MODEL IN THE MODEL REGISTRY
S222

DEPLOYING THE NEW VERSION OF THE TARGET MODEL TO AN INFERENCE ENDPOINT
S224

CREATING A MODEL GROUP FOR THE TARGET MODEL S310

REGISTERING THE TARGET MODEL IN THE MODEL GROUP S320

400

DETECTING AN EVENT INDICATING THAT THE TARGET MODEL SHOULD BE UPDATED
S410

SENDING A NOTIFICATION TO A USER ABOUT THE EVENT S420

500

RECEIVING A USER COMMAND TO TRIGGER A MODEL UPDATING PIPELINE TO UPDATE THE TARGET MODEL  S510

TRIGGERING THE MODEL UPDATING PIPELINE TO UPDATE THE TARGET MODEL S520

CONTINUAL MACHINE LEARNING IN A PROVIDER NETWORK

TECHNICAL FIELD

The present disclosure relates generally to cloud machine learning platform systems and methods for creating, training, and deploying machine learning models in the cloud, and more specifically to a new and useful system and method for continual machine learning in the cloud machine learning platform field.

BACKGROUND

In cloud machine learning platforms, conventional systems and methods for continual machine learning rely on heuristics. For example, a machine learning model may be periodically retrained from scratch at a predetermined frequency (e.g., daily) using the most recently obtained training data within a sliding time window of predetermined length (e.g., the past three months). However, the heuristic approach comes with limitations. First, users may select a higher than necessary model retraining frequency to prevent model performance degradation (e.g., to prevent degradation in model inference accuracy). Second, retraining from scratch can be wasteful of compute resources, such as when there is no significant change in the distribution of the training data. Third, the tuning of model hyperparameters that could increase model performance is often ignored or avoided.

Thus, there is a need in the cloud machine learning platform field to create an improved and useful system and method for continual machine learning.

BRIEF DESCRIPTION OF DRAWINGS

Various examples in accordance with the present disclosure will be described with reference to the drawings, in which.

Figure 1:
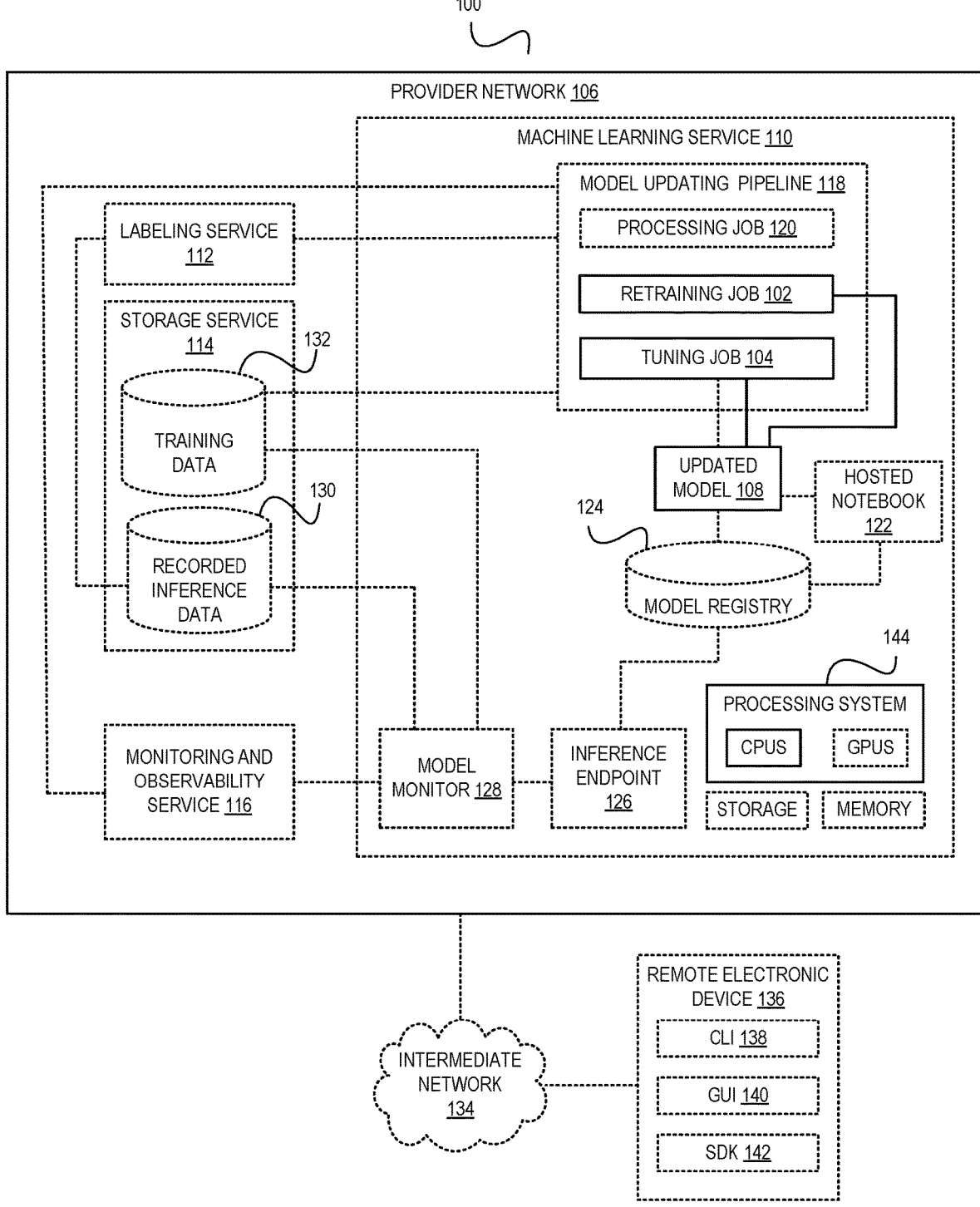
FIG. 1 is a schematic of a provider network system for continual learning.

It will be appreciated that for simplicity or clarity of illustration, elements illustrated in the figures have not necessarily been drawn to scale. For example, the dimensions of an element may be exaggerated relative to another element for clarity. Further, if considered appropriate, reference numerals have been repeated among the figures to indicate corresponding or analogous elements.

DETAILED DESCRIPTION

The following description is not intended to limit the invention to the examples described, but rather to enable any skilled person in the art to make and use this invention.

1. Overview

The present disclosure relates to a system and a method for continual machine learning in a provider network.

As shown in FIG. 1, a system 100 for continual machine learning includes at least one a retraining job 102 or at least one tuning job 104 executed in a provider network 106 to yield an updated machine learning model 108. Additionally or alternatively, the system 100 can include or interface with any or all of: a machine learning service 110, a labeling service 112, a storage service 114, a monitoring and observability service 116, or any other suitable components or combination of components.

Figure 2:
FIG. 2 is a schematic of a method for continual learning in a provider network.

As shown in FIG. 2, a method 200 for continual machine learning in a provider network includes at least one of retraining a target machine learning model S210 or tuning hyperparameters S220 to yield a new version of the target model. Additionally or alternatively, the method 2000 can include any or all of: registering the target model in a model registry S202; sending a model updating signal S204; receiving a command to trigger a model updating pipeline S206; registering the new version of the target model in the model registry S222; deploying the new version of the target model to an inference endpoint S224; or any other suitable processes. The method can be performed with a system as described above or with any other suitable system.

2. Benefits

The system or the method for continual machine learning in a provider network can confer the benefit of model retraining or hyperparameter tuning through a semi-automated or a fully automated process, achieving continual machine learning.

This in turn confers the benefit of achieving model adaptability by any or all of: refining understanding of previous learned concepts over time as new training data with new information becomes available; learning new concepts over time as new training data with new information becomes available; avoiding model performance degradation over time (e.g., catastrophic forgetting) in rapidly evolving domains (e.g., online advertising, online retail; online music streaming services, etc.); detecting changes in the data distribution of training data over time; tuning model hyperparameters over time; or any other suitable processes.

Additionally or alternatively, the system or the method can confer any other benefit.

3. System

The system 100 functions to enable continual machine learning of a machine learning model in a provider network 106 and includes: at least one of the retraining job 102 or the tuning job 104 for yielding the updated machine learning model 108. Additionally or alternatively, the system can include any or all of: the machine learning service 110, a model updating pipeline 118, a processing job 120, a hosted notebook 122, a model registry 124, an inference endpoint 126, a machine learning model monitor 128, the monitoring and observability service 116, the storage service 114, recorded inference data 130, training data 132, the labeling service 112, or any other suitable components or combination of components.

The system 100 is configured to implement or interface with a system which implements a semi-automated or fully automated architecture of continual machine learning, the semi-automated or fully automated architecture implementing user-configurable model retraining or hyperparameter tuning, which is enabled by a provider network. This functions to adapt a model over time to new information in the training data 132 while also potentially providing an adaptive, user-friendly, flexible, or customizable continual learning process.

In a first set of variations, the system 100 is implemented to continually learn machine learning models for classification or regression tasks. In these variations, the models can be artificial neural network models, but can additionally or alternatively be other types of machine learning models suitable for classification or regression tasks (e.g., linear regression models, logistic regression models, support vector machine (SVM) models, decision tree models, ensemble learning models, random forest models, etc.). Additionally or alternatively, the system 100 can be implemented to continually learning models for other tasks including any of all of: tuning of large pre-trained models (e.g., bidirectional encoder representations from transformers (BERT) models, residual neural network (ResNet) models, etc.); continual learning of models for ranking problems where each point is a list of items and the signal about their relevance is biased by a ranking policy; continual learning of models for tabular data where feed-forward neural networks often do not provide state of the art performance, or any other suitable continual learning tasks.

The system 100 includes a provider network 106, which functions to provide a computing environment in which the techniques for continual machine learning are implemented. The provider network 106 can be programmed or configured to adhere to a cloud computing model. The model can enable ubiquitous, convenient, on-demand network access to a shared pool of configurable resources such as virtual machines, containers, networks, servers, storage, applications, services, or any other configurable resource of the provider network 106. The resources can be rapidly provisioned and released with minimal management effort or service provider interaction.

A user of the provider network 106 (sometimes referred to herein as a "customer" of the provider network 106) can unilaterally provision resources in the provider network 106, such as virtual machines, containers, server time, network storage, or any other resource, as needed automatically without requiring human interaction with the service provider.

Resources of the provider network 106 can be available over an intermediate network 134 (e.g., the Internet) and accessed through standard mechanisms that promote use by heterogeneous remote electronic devices (e.g., 136) such as thin or thick client platforms or any other type of computing platform such as desktop computers, mobile phones, tablet computers, laptop computers, workstation computers, smart appliances, Internet-of-Things (IoT) devices, or any other type of electronic device.

Resources such as storage, processing, memory, and network bandwidth in the provider network 106 can be pooled to serve multiple customers using a multi-tenant model, with different physical and virtual resources dynamically assigned and reassigned according to customer demand There can be a sense of location independence in that the customer generally can have no control or knowledge over the exact location of provided resources but can be able to specify location at a higher level of abstraction such as, for example, at the level of a country, state, datacenter, or any other location granularity.

The provider network 106 can automatically control and optimize resource use by leveraging a metering capability (e.g., on a pay-per-use, on a charge-per-use basis, on a subscription basis, or any other fee basis) at a level of abstraction appropriate to the type of service such as storage, processing, bandwidth, active customer accounts, or any other level of abstraction. Resource usage in the provider network 106 can be monitored, controlled, and reported, providing transparency for both the provider and the customer of a utilized service.

The provider network 106 can provide its capabilities to customers according to a variety of different service models including SaaS, PaaS, IaaS, or any other service model.

With SaaS, a capability can be provided to a customer using the provider network 106's software applications running on the infrastructure of the provider network 106. The applications can be accessible from various remote electronic devices (e.g., 136) through either a thin client interface such as a command line interface (CLI) 138, a graphical user interface (GUI) 140 (e.g., via a web browser or a mobile or web application), a Software Development Kit (SDK) 142, or any other interface. The infrastructure of the provider network 106 can include the hardware resources such as server, storage, and network components and software deployed on the hardware infrastructure that support the services being provided. Typically, under the SaaS model, the customer does not manage or control the underlying infrastructure including network, servers, operating systems, storage, or individual application capabilities, except for limited customer-specific application configuration settings.

With PaaS, the customer can be provided the capability to deploy, onto hardware and software infrastructure of the provider network 106, customer-created or acquired applications using programming languages, libraries, services, and tools supported by the provider network 106 or other sources. Typically, under the PaaS model, the customer does not manage or control the underlying hardware and software infrastructure including network, servers, operating systems, or storage, but can have control over the deployed applications and possibly configuration settings for the application-hosting environment.

With IaaS, the customer can be provided the capability to provision processing, storage, networks, and other fundamental computing resources where the customer can deploy and run arbitrary software, which can include operating systems and applications. The customer typically does not manage or control the underlying hardware and software infrastructure but can have control over operating systems, storage, and deployed applications and possibly limited control of selecting network components such as, for example, host firewalls.

The provider network 106 can provide its capabilities to a customer according to a variety of different deployment models including as a private cloud, as a community cloud, as a public cloud, as a hybrid cloud, or any other deployment model.

In a private cloud, the hardware and software infrastructure of the provider network 106 can be provisioned for exclusive use by a single organization which can comprise multiple customers. The private cloud can be owned, managed, and operated by the organization, a third party, or some combination of them, and it can exist on or off premises.

In a community cloud, the hardware and software infrastructure of the provider network 106 can be provisioned for exclusive use by a specific community of customers from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure can be provisioned for open use by the public. The public cloud can be owned, managed, and operated by a business, academic, or government organization, or some combination of them. A public cloud can exist on the premises of the public cloud provider.

In a hybrid cloud, the infrastructure can be a composition of two or more distinct cloud infrastructures (private, community, public, or any other cloud infrastructure) that remain unique entities, but that can be bound together by standardized or proprietary technology that enables data and application portability such as, for example, cloud bursting for load balancing between clouds.

The system 100 includes at least one of the retraining job 102 or the tuning job 104. The retraining job 102 functions to retrain a machine learning model (sometimes referred to herein as the "target model") to yield a new or updated version of the target model (sometimes referred to herein as the "updated target model 108" or just "updated model 108").

The retraining job 102 can be designed to handle a learning process with a sequential nature, where only one batch of training data 132 from a sequence or stream of training data batches is available at once. The adaptive learning capabilities of the retraining job 102 allows for handling a stream of training data 132 with non-stationary or non-independent and identically distributed (non-IDD) characteristics while addressing the challenge of learning without catastrophic forgetting, where model performance on a previously learned batch significantly degrades over time as new batches are learned.

To enable this, the retraining job 102 can be designed to implement a continual learning strategy (equivalently referred to herein as a continual learning algorithm). The algorithm accepts a sequence of training batches over time. Each batch encompasses a set of data samples for the batch and a corresponding set of ground truth labels. A goal of the algorithm when learning the updated model from a current batch can be to control the statistical risk of previously learned from batches under the constraint of limited to no access to the data samples and ground truth labels of the previously learned from batches. A batch can encompass non-stationary or non-independent and identically distributed (non-IID) data. For example, a batch can encompass a new group of classes, a new domain, or a different output space. At runtime, for instance, the algorithm takes a current batch as input and determines optimal model parameters for the updated model by optimizing a function that controls for the statistical risk of seen batches given limited or no access to data from previous batches.

The tuning job 104 can be designed to perform hyperparameter tuning (equivalently referred to herein as a hyperparameter optimization). The optimization capabilities of the tuning job 104 allow for improving the inference performance of the updated model 108 without the tedium of a manual trial and error process.

To enable this, the tuning job 104 can be designed to implement a hyperparameter optimization strategy (equivalently referred to here as a HPO algorithm). The target model can be associated with a set of hyperparameters that control a machine learning algorithm or the architecture of an underlying statistical model. Examples of hyperparameters include the learning rate, dropout rate, momentum, the number of units per layer, or any other suitable hyperparameters. The HPO algorithm can be configured or designed to automatically find a specific configuration that maximizes the validation performance of a machine learning algorithm. For example, the HPO algorithm can be configured or designed to perform a random search, where possible hyperparameter configurations are sampled from a predefined probability distribution. Additionally or alternatively, the HPO algorithm can be configured to designed to perform any or all of: Bayesian optimization by maintaining a probabilistic model of an objective function about validation performance to guide a search toward a global optimum in a sequential manner; early stopping of the evaluation of hyperparameter configurations that are unlikely to achieve a good performance; parallelization of the tuning process across distributed compute resources in the provider network; or any other suitable hyperparameter tuning process.

Additionally or alternatively, the system 100, the retraining job 102, or the tuning job 104 can be otherwise configured or designed.

The system 100 includes the updated machine learning model 108. The updated model 108 is yielded as a result of executing any or all of: the processing job 120, the retraining job 102, the tuning job 104, or any other suitable job or combination of jobs.

The updated model 108 includes the output that results from the retraining job 102 or the tuning job 104 or data representing other information required for deploying the updated model 108 to the inference endpoint or loading the updated model 108 in a session of the hosted notebook 122. The updated model 108 can include trained model parameters (learned model weights), hyperparameters, a model definition that describes how to compute inferences or other metadata, or any other suitable model artifact data. The updated model can encompass one or more files, the number and content of which may vary depending on the machine learning algorithm used for training.

The system 100 can include the remote electronic device 136. The remote electronic device 136 may interface with the provider network 106 via the intermediate network 134. Such interfacing may be accomplished at the remote electronic 136 device using any or all of: the graphical user interface (GUI) 140 (e.g., a GUI of a web browser application or a mobile application); the command line interface (CLI) 138; or an application or computing process executing at the remote electronic device 136 that is designed or configured to interface with the provider network 106 via the intermediate network 134 using the software development kit (SDK) 142 (e.g., an SDK provided by or downloaded from the provider network). Interfacing between the provider network 106 and the remote electronic device 136 may occur according to an application programming interface (API) offered by the provider network 106 to the remote electronic device 136.

In some variations, the system 100 includes the model updating pipeline 118. The model updating pipeline 118 can encompass a set of one or more pipeline jobs defined with the provider network 106 using the GUI 140, the CLI 138, or the SDK 142 of the remote electronic device 136. The pipeline definition in the provider network 106 can encode the model updating pipeline 118 using a directed acyclic graph (DAG) data structure. The DAG can provide information on the requirements for and the relationships between pipeline jobs. The structure of the DAG can be defined according to the data dependencies between pipeline jobs. A data dependency can exist when the properties of a pipeline job's output as provided as input to another pipeline job. The model updating pipeline 118 can include just the retraining job 102, just the tuning job 104, or both the retraining job 102 and the tuning job 104. Additionally or alternatively, the model updating pipeline 118 can include any or all of: the processing job 120 for data processing such as for feature engineering, data validation, model evaluation, or model interpretation; a model job to create or register a model; a condition job to evaluate the condition of job properties to assess which action should be taken next in the pipeline; a callback job to incorporate additional processes or provider network services into the pipeline that are not provided for as part of the basic building block set of pipeline job types; a lambda job to run an existing serverless function with an on-demand code execution service of the provider network (not shown); a clarify checking job to conduct baseline data drift checks against previous baselines for bias analysis and model explain-ability; a quality checking job to conduct baseline suggestions and data drift checks against a previous baseline for data quality or model quality in the pipeline; a clustering job for submitting mapreduce jobs to big data computing frameworks such as APACHE HADOOP, APACHE SPARK, or the like; a fail job to halt the pipeline when a condition of job properties is not met; or any other suitable model updating pipeline job.

In some variations, the system 100 includes the model registry 124. The model registry 124 can store machine learning models as versioned entities. Each update of a model can be assigned a new version. Version models can be grouped within the model registry 124 in model groups. A model group can be a named collection of versioned models.

In some variations, the system 100 includes the hosted notebook 122. The hosted notebook 122 can allow a web-based, integrated development environment (IDE) (e.g., at the remote electronic device 136) to build, train, retrain, tune, deploy, or monitor machine learning models in the provider network 106. The hosted notebook 122 can include functionality allowing a user of the remote electronic device 136 to write and execute code in the hosted notebook 122 for carrying out machine learning tasks such any or all of: preparing data for machine learning; building and training machine learning models; deploying the models and monitoring the performance of their predictions; tracking and debugging machine learning experiments; or any other suitable machine learning notebook task.

In some variations, the system 100 includes the model monitor 128. The model monitor 128 can be designed or configured to continuously monitor machine learning models deployed at inference endpoints in provider network 106. The monitoring performed by model monitor 128 can include any or all of: monitoring data quality; monitoring model quality; monitoring bias drift for models; monitoring feature attribution drift for models; or any other suitable machine learning model monitoring task.

In some variations, the system 100 includes the inference endpoint 126. The target model or the updated model 108 can be deployed to the inference endpoint 126 for making predictions (inferences) using the deployed model. The inference endpoint 126 can be one of several different possible inference endpoint types. One type of inference endpoint is a real-time inference endpoint. A real-time inference endpoint can be used for continuous or near continuous, real-time, interactive, low-latency inferences or predictions. Another type of inference endpoint is a "serverless" inference endpoint. A serverless inference endpoint is well suited for inference workloads that have idle periods between traffic spurts and that can tolerate cold starts. Another type of inference endpoint is an asynchronous inference endpoint. An asynchronous inference endpoint queues inference requests and processes them asynchronously against the deployed model and is well suited for inference requests with large request payloads (e.g., up to 1 GB), long processing times (up to 15 minutes), and near real-time latency requirements. Another type of inference endpoint is a batch transform inference endpoint. A batch transform inference endpoint is useful to preprocess datasets to remove noise or bias that interferes with inference, to get inferences from large datasets, to run inference when a persistent inference endpoint is not required, or to associate input records with inferences to assist the interpretation of results.

The system 100 can include the machine learning service 110 in the provider network 106. The machine learning service 110 can include components that enable users to create, train, and deploy machine learning models in the provider network 106. The components of the machine learning service 110 can include any or all of: the retraining job 102, the tuning job 104, the model updating pipeline 118, the updated model 108, the hosted notebook 122, the model registry 124, the inference endpoint 126, the model monitor 128, or any other suitable components.

The system 100 can include the monitoring and observability service 116 in the provider network 106. The monitoring and observability service 116 can be designed or configured for collecting, monitoring, analyzing, and acting on metric streams. The monitoring and observability service 116 can collect monitoring and operational data in the form of logs, metrics, and events. The monitoring and observability service 116 can provide a user with a unified view of systems operational health so that the user gains visibility of the user's computing resources, applications, and services running in provider network. The monitoring and observability service 116 can allow a user to detect anomalous behavior in computing environments, set alarms, visualize log data and metrics side-by-side, take automated actions, troubleshoot issues, and discover insights to keep the user's computing applications running smoothly. The monitoring and observability service 116 can be a repository for set of metrics that are generated by the model monitor 128.

The system 100 can include the storage service 114 in the provider network 106. The storage service 114 can be an object storage service that offers data object storage through an API. A basic data storage unit of storage service can be an object, which can be organized into "buckets." Each object can be identified by a unique key. Storage service can also provide access control, encryption, and replication at the bucket layer or on a per-object basis.

The system 100 can include the labeling service 112 in the provider network 106. The labeling service 112 can enable a user to identify raw data, such as images, text files, and videos; add informative labels; and generate labeled synthetic data to create training datasets 132 for learning machine learning models. The labeling service 112 can be used to manage a human workforce of labelers. For example, a user can create a labeling workflow with the labeling service 112 and the labeling service manages the labeling workflow including interfacing with the human workface on the user's behalf. Additionally or alternatively, the labeling service 112 can provide tools, interfaces, and APIs for the user to create, manage, and operate their own labeling workflows, or for automatically generating labeled synthetic training data 132.

The provider network 106 includes a processing system 144, which functions to process the inputs received at the provider network 106. The processing system 144 include a set of one or more central processing units (CPUs) and optionally a set of one or more graphical processing units (GPUs) but can additionally or alternatively include any other hardware components or combination of hardware components (e.g., processors, microprocessors, system-on-a-chip (SoC) components, etc.). Any of or all of: CPUS, GPUS, and other hardware components or combination of hardware components can be components of a set of one or more electronic devices (e.g., electronic device 900 described below with respect to FIG. 9.).

The processing system 144 can optionally further include any or all of: memory, storage, or any other suitable hardware components. Any or all of: storage, memory, and other suitable hardware components can be components of a set of one or more electronic devices (e.g., electronic device 900 described below with respect to FIG. 9.).

Further additionally or alternatively, the system 100 can include any other suitable components or combination of components.

4. Method

As shown in FIG. 2, a method 200 for continual machine learning in the provider network 106 includes at least one of retraining S210 a target machine learning model or tuning S220 hyperparameters to yield the updated model 108. Additionally or alternatively, the method 2000 can include any or all of: registering S202 the target model in the model registry 124; sending S204 a model updating signal; receiving S206 a command to trigger the model updating pipeline 118; registering S222 the updated model 108 in the model registry 124; deploying S224 the updated model 108 to the inference endpoint 126; or any other suitable processes.

The method implements or interfaces with a system implementing continual machine learning as described above, but can additionally or alternatively implement or interface with methods implementing any other suitable continual machine learning.

The method 200 functions to implement a semi-automated or fully automated process of continual machine learning, the semi-automated or fully automated process implementing user-configurable model retraining or hyperparameter tuning, which is enabled by a provider network. This functions to adapt a model over time to new information in the training data 132 while also potentially providing an adaptive, user-friendly, flexible, or customizable continual learning process.

The method 200 can be performed with the system 100 as described above, but can additionally or alternatively be performed with any suitable system.

The method 200 can be performed repeatedly to update the target model over time, but additionally or alternatively can be performed at any or all of: a predetermined frequency (e.g., constant frequency), in response to a trigger, at a set of intervals (e.g., random intervals), once, or at any other suitable times.

Figure 3:
FIG. 3 is a schematic of a method for registering a target model in a model registry.
Figure 3:
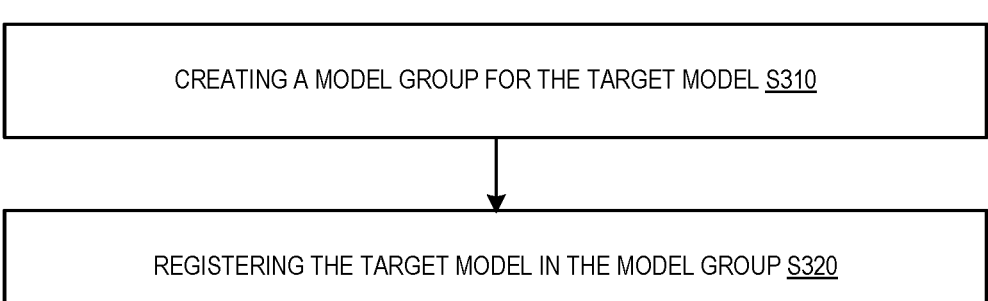

The method 200 can optionally include the step of registering S202 the target model in the model registry 124. As shown in FIG. 3, the method 300 for registering the target model in the model registry 124 can include creating S310 a model group for the target model; registering S320 the target model in the model group; or any other suitable processes.

The model registry 124 can organize collections of versioned models by groups. Each model group can contain a group of versioned machine learning models. A model group for the target model can be created in the model registry 124 based on the provider network 106 receiving a command from the remote electronic device 136 of a user. The command may be issued by the user via the GUI 140, the CLI 138, or the SDK 142 of the remote electronic device 136. The provider network 106 can receive the command (and other commands sent from the remote electronic device 136) via the intermediate network 134 and according to a set of one or more suitable network data communications protocols such as any or all of: the Transmission Control Protocol (TCP); the Internet Protocol (IP), the HyperText Transfer Protocol (HTTP); the Transport Layer Security (TLS) protocol; or any other suitable protocol or combination of protocols.

The command to create the model group can specify information about the model group to create such as a name for the model group, a description for the model group, a set of one or more key-value pairs (tags) to associate with the model group, a machine learning service project to associate with the model group, or any other suitable model group registration information.

Based on receiving the command, the model group for the target model is created S310 in the model registry. At this point, the newly created model group may be empty in that it does not contain any versioned models.

As applicable to method 300 and the other methods described herein, the target model can be a supervised learning machine learning model (e.g., a logistic regression, decision tree, Naïve Bayes, Support Vector Machine, or artificial neural network model for a classification task; or a linear regression, decision tree, random forest, or artificial neural network model for a regression task); an unsupervised learning machine learning model (e.g., a K-means clustering, hierarchical clustering, density-based clustering, or mean-shift clustering model for clustering; or a principle component analysis (PCA) or singular value decomposition (SVD) model for dimensionality reduction), a deep neural network model (e.g., a convolution neural network (CNN), recurrent neural network (RNN), or autoencoder model), or any other suitable type of machine learning model.

The target model can be a pre-trained model. For example, the target model can be a pre-trained neural network model used for image classification (e.g., VGG-16, ResNet50, Inceptionv3, EfficientNet, or other suitable model); a pre-trained model used for natural language processing (e.g., Open AI GPT Series, BERT variations, ELMo variations, or other suitable model); or any other suitable pre-trained model.

The target model can be registered S320 in the model registry 124. Registering the target model in the model registry 124 may function not associate the target model with the model group created S310. Registering S320 1 the target model in the model registry 24 may include storing model artifacts in the model registry 124. The model artifacts may take the form of a collection of one or more files, possibly as part of a compressed archive file (e.g., ZIP file). The file or files may contain data defining the target model so that the target model can be used for making inferences at the inference endpoint 126. Such data may include learned model weights (parameters), hyperparameters, metadata, helper code, inference code, or any other code or data used for making inferences at the inference endpoint 126 using the target model.

When registering S320 the target model in the model registry 124, the target model may be assigned a version (e.g., a monotonically increasing number) to distinguish it from previous versions of the target model and from future versions of the target model (e.g., the updated model 108).

Figure 4:
FIG. 4 is a schematic of a method for sending a model updating signal.
Figure 4:
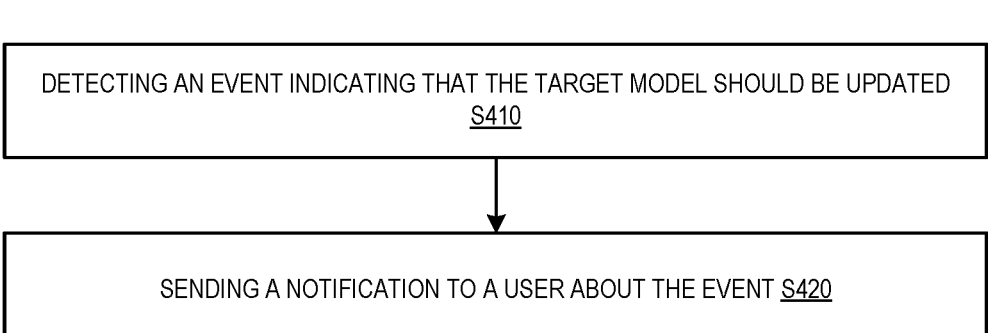

The method 200 can optionally include the step of sending S204 a model updating signal. As shown in FIG. 4, a method for sending S204 a model updating signal includes detecting S410 an event indicating that the target model should be updated and sending S420 a notification to a user about the event.

The target model may be deployed at the inference endpoint 126 to make inferences (predictions). During this time, the model monitor 128 can monitor the target model for data quality, model quality, bias drift, or feature attribution drift.

Data quality monitoring by the model monitor 128 can include automatically monitoring the target model for data quality over time and sending a set of one or more streams of data quality metrics to the monitoring and observability service 116. The data on which the target model makes inferences may differ or drift in statistical character from the training data 132 on which the target model is trained. If the statistical nature of the data received by the target model drifts away from the nature of the baseline data on which it was trained, then the target model may begin to lose accuracy in its inferences (e.g., predictions). The model monitor 128 can use rules to detect data drift and alert a user when drift occurs.

Data quality monitoring by the model monitor 128 can include capturing inference input to the target model and inference output from the target model for this input over time and storing it as recorded inference data 130 in the storage service 114. A baseline job may be run by the model monitor 128 that analyzes a baseline dataset of the recorded inference data 130. The baseline job can compute baseline schema constraints and statistics of the baseline dataset. The model monitor 128 can then periodically run monitoring jobs that each analyze subsequent monitored datasets of the recorded inference data 130 for comparison against the baseline dataset. For example, the model monitor 128 may compare an approximate quantile sketch computed from the baseline dataset to an approximate quantile sketch computed from the monitored dataset to determine if there is a significant change (e.g., more than a threshold change) in the underlying distribution of the recorded inference data 130 over time. If a significant change is detected S410, then a notification can be sent S420 by the model monitor 128 to a user informing the user of the significant change. Additionally or alternatively, the statistics or metrics computed by the model monitor 128 (e.g., the approximate quantile sketches) can be sent (streamed) to the monitoring and observability service 116 which can process the statistics using user-configured rules and thresholds to alert the user when there is a significant change in the underlying distribution of the recorded inference data 130 being input and output by the target model when making inferences.

Model quality monitoring by the model monitor 128 can include monitoring the performance of the target model by comparing the inference (e.g., predictions) that the target model makes with the actual ground truth labels that the target model is attempting to predict. To do this, the model monitor 128 can merge data that is captured from real-time inference as recorded inference data 130 in storage service

114 over time with actual labels provided by a user (e.g., stored in the storage service 114). The predictions by the target model can be compared by the model monitor 128 to the actual labels. To measure model quality, the model monitor 128 can use metrics that depend on the particular target model. For example, if the target model is used for a regression task, then one of the metrics evaluated by the model monitor 128 can be mean square error (mse). Other regression tasks metrics that can be evaluated by the model monitor 128 include mean absolute error (mae), root mean square error (rmse), or coefficient of determination (r2). Binary classification task metrics that can be evaluated by the model monitor 128 include confusion matrix, recall, precision, accuracy, recall best constant classifier, precision best constant classifier, accuracy best constant classifier, true positive rate, true negative rate, false positive rate, false negative rate, receiver operating characteristic curve, precision recall curve, area under the curve, f0.5 score, f1 score, f2 score, f0.5 best constant classifier, f1 best constant classifier, or f2 best constant classifier. Multiclass classification task metrics that can be evaluated by the model monitor 128 include confusion matrix, accuracy, weighted recall, weighted precision, weighted f0.5 score, weighted f1 score, weighted f2 score, accuracy best constant classifier, weighted recall best constant classifier, weighted precision best constant classifier, weighted precision best constant classifier, weighted f0.5 best constant classifier, weighted f1 best constant classifier, or weighted f2 best constant classifier.

Model quality monitoring by the model monitor 128 can include capturing inference input to the target model and inference output from the target model over time and storing it as recorded inference data 130 in the storage service 114. A baseline job may be run by the model monitor that compares predictions from the target model with ground truth labels in a baseline dataset. The baseline job may automatically create baseline statistical rules and constraints that define thresholds against which the target model performance is evaluated. The user can define and schedule model quality monitoring jobs with the model monitor. The model monitor may ingest into the storage service 114 ground truth labels that the model monitor 128 merges with recorded inference data 130 (captured inference/prediction data) from the inference endpoint 126 where the target model is deployed. The model monitor 128 can then run the defined monitoring jobs according to the schedule. Each monitoring job can compute one or more model monitoring metrics based on merging recent predictions from the target model with ground truth labels for those predictions. The model monitoring metric(s) computed by a monitoring job can be compared against the model monitoring metric(s) computed for the baseline dataset. A significant difference (e.g., more than a threshold difference) between the two sets of metrics can be detected S410 as an event indicating that the target model should be updated. In that case, a notification can be sent S420 by the model monitor to a user informing the user of the significant difference. Additionally or alternatively, the model monitoring statistics computed by the model monitor 128 (can be sent (streamed) to the monitoring and observability service 116 which can process the statistics using user-configured rules and thresholds to alert the user when there is a significant change the model monitoring metrics.

Model monitor may also monitor bias drift or feature attribution drift of the target model over time. A significant drift may be detected S410 as an event indicating that the target model should be updated. In that case, a notification can be sent S420 by the model monitor to a user informing the user of the bias or feature attribution drift. Additionally or alternatively, bias drift or feature attribute drift statistics computed by the model monitor 128 can be sent (streamed) to the monitoring and observability service 116 which can process the statistics using user-configured rules and thresholds to alert the user when there is a significant bias or feature attribution drift.

Bias drift can be introduced into the target model when the data used in training the target model differs from the data input to the target model at the inference endpoint 126 used to generate predictions. This can be especially pronounced if the data used for training changes over time (e.g., fluctuating interest rates). In this case, the predictions by the target model may not be accurate unless the target model is updated (retrained) with updated training data 132. As the target model is monitored by the model monitor 128, a user can view exportable reports and graphs detailing any bias in the hosted notebook 122. The user can also configure alerts with the monitoring and observability service 116 to receive notifications if a bias metric exceeds a threshold. With the bias monitoring capabilities in the model monitor 128, when bias beyond a threshold is detected S410, the model monitor can automatically generate and send S420 a notification to a user informing of the bias drift.

Reference is made herein to sending a notification to a user as in step S420. Such notification can be made by various mechanisms. For example, the notification can be made via an e-mail message or text message sent to the user and received as the remote electronic device 136 of the user. Additionally or alternatively, the notification can be via the GUI 140, the CLI 138, or the SDK 142 at the user's remote electronic device 136. In some examples, the notification is made via the hosted notebook 122 associated with the user.

The model monitor 128 may function to monitor the bias metrics of the target model deployed at the inference endpoint 126. The monitoring can be continuous or periodic and the model monitor 128 can raise automated alerts if a bias metric exceeds or falls below a threshold. The bias metric can be the difference in positive proportions in predicated labels (DPPL) bias metric that determines whether the target model predicts outcomes differently for each facet. More formally, the DDPL bias metric can be defined as the difference between the proportion of positive predictions for a first facet and the proportion of positive predictions for a second facet. For example, consider a target model that makes predictions to approve or deny loans. If the target model approves 60% of a middle-aged group (a first facet) and 50% of another aged group (a second facet), then the target model might be biased against the second facet. Other bias metrics that model monitor 128 may use in addition to or instead of DPPL to measure the bias of the target model on a set of inferences made by the target model include any or all of: disparate impact (measures the ratio of proportions of the predicted labels for a favored facet and a disfavored facet); conditional demographic disparity in predicted labels (CDDPL) (measures the disparity of predicted labels between the facets as a whole, but also by subgroups); counterfactual fliptest (FT) (exatnines each member of a first facet and assesses whether similar members of a second facet have different model predictions); accuracy difference (AD) (measures the difference between the prediction accuracy for favored and disfavored facets); recall difference (AD) (compares the recall of the model for favored and disfavored facets); difference in conditional acceptance (DCAcc) (compares the observed labels to the labels predicted by the target model and assess whether this is the same across facets for predictive positive outcomes (acceptances); difference in acceptance rates (DAR) (measures the difference in the ratios of the observed positive outcomes (TP) to the predicted positives (TP+FP) between favored and disfavored facets; specificity difference (SD) (compares the specificity of the target model between favored and disfavored facets); difference in conditional rejection (DCR) (compares the observed labels to the labels predicted by the target model and assess whether this is the same across facets for negative outcomes (rejections); difference in rejection rates (DRR) (measures the difference in the rations of the observed negative outcomes (TN) to the predicted negatives (TN+FN) between disfavored and favored facets; treatment equality (TE) (measure the difference in the ration of false positives to false negatives between favored and disfavored facets); generalized entropy (GE) (measures the inequality in benefits assigned to each input by the target model predictions).

A drift in the distribution of inference data input to the target model for making inferences can result in a corresponding drift in the feature attribution values. The model monitor 128 may monitor the target model for feature attribution drift. As the target model is monitored by the model monitor 128, users can view exportable reports and graphs detailing feature attributes in the hosted notebook 122 and also configure alerts in the monitoring and observability service 116 to receive notifications if the model monitor 128 or the monitoring and observability service 116 detects S410 that the attribution values drift above or below a certain threshold.

The model monitor 128 can detect S410 feature attribution drift by comparing the ranking of individual features changes from the training data 132 on which the target model is trained to inference data input to the target model at inference endpoint 126 for making inferences. In addition to detecting changes in ranking order, the model monitor 128 can also detect changes in raw attribution scores of features. For example, given two features that fall in the ranking by the same number of positions going from training data 132 to inference data 130, the model monitor 128 may be more sensitive to the feature that had a higher attribution score in the training data 132. For example, the normalized discounted cumulative gain (NDCG) score can be used by the model monitor 128 for comparing the feature attributions rankings of training and inference data. The NDCG score can be computed as a value between 0 and 1 where 1 being the best possible value. For example, the NDCG score can be computed as a DCG quantity divided by an iDCG quantity. The DCG quantity measures whether features with high attribution in the training data 132 are also ranked higher in the feature attribution computed on the live inference data 130. The quantity iDCG measures the ideal score and normalizes the NDCG score to a value between 0 and 1 where a NDCG value of 1 means that the feature attribution ranking in the inference data 130 is the same as the feature attribution ranking in the training data 132. In some examples, if the NDCG score falls below a threshold (e.g., 0.90), then the model monitor 128 or the monitoring and observability service 116 detects S410 this as a significant feature attribution drift indicating that the target model should be updated.

In sum, the model monitor 128 can monitor the target model as it is deployed at the inference endpoint 126 for and while making inferences. The model monitor can monitor the target model for any or all of: data drift, model drift, bias drift, feature attribution drift, or other type of drift indicating whether the target model should be updated. This monitoring may yield a set of time series metrics including any or all of the metrics discussed above. The metrics can be analyzed by the model monitor 128. Additionally or alternatively, the metrics can be sent (streamed) by the model monitor 128 to the modeling and observability service 116 for analysis. Analyses of the time series metrics may include detecting S410 whether a metric or a set of metrics or an aggregation of metrics exceeds a threshold or drops below a threshold where exceeding or dropping below the threshold corresponds to an event indicating that the target model should be updated.

In addition to or instead of calculating data drift, model drift, bias drift, or feature attribution drift for the target model, the model monitor 128 may also record the inference data 130 input to the target model and the inferences (predictions) made by the target based on the input inference data. The model monitor may record this data 130 as recorded inference data in the storage service 114. The model monitor 128 may use the recorded inference data 130, in addition to potentially other data stored in the storage service (e.g., training data 132, ground truth labels), when computing drift metrics.

Based on detecting S410 that the target model should be updated according to one or more drift metrics, a user may receive a notification sent S420 by or from the provider network 106. The notification may inform the user of the drift metric or metrics that triggered the notification including their value or values and the threshold or thresholds that were exceeded or dropped below or otherwise not met. The notification can be received by the user as an e-mail message, a text message, an in-app notification, via hosted notebook 122, or otherwise in the GUI 140, the CLI 138, or via the SDK 142 at the remote electronic device 136 of the user.

Figure 5:
FIG. 5 is a schematic of a method for receiving a command to trigger a model updating pipeline.
Figure 5:
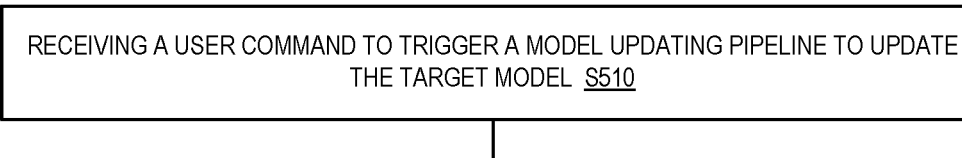

The method 200 can optionally include the step of receiving S206 a command to trigger the model updating pipeline 118. As shown in FIG. 5, a method of receiving a command to trigger the model updating pipeline 118 can include the steps of receiving S510 a user command to trigger a model updating pipeline for the target model and triggering S520 the model updating pipeline for the target model S520.

The user command to trigger the model updating pipeline 118 can be sent from the remote electronic device 136 of the user. For example, sending of user command from the remote electronic device 136 can be caused by user interaction with the GUI 140, the CLI 138, or via the SDK 142 at the remote electronic device 136 of the user. The provider network 106 may receive S510 the user command And in response, the provider network can start (trigger) S520 execution of the model updating pipeline 118 including executing the first job of the pipeline (e.g., the processing job 120, the retraining job 102, the tuning job 104, or other suitable pipeline job). The user command can specify any parameters of the retraining job 102 or the tuning job 104 including any of all of: data storage locations of training data 132, validation data, or test data; selection of a continual learning algorithm for the retraining job 102; selection of a hyperparameter optimization algorithm for the tuning job 104; selection of a loss function; or any other suitable pipeline, retraining, or tuning parameters.

While in some examples the model updating pipeline 118 for the target model is triggered S520 in response to the provider network receiving S510 a user command from a remote electronic device of a user, the provider network 106 can automatically trigger the model updating pipeline 118 for the target model. For example, the monitoring and observability service 116 can cause an API of the machine learning service 110 to be invoked to trigger execution S520 of the model updating pipeline 118 for the target model in response to the monitoring and observability service 116 detecting S410 an event indicating that the target model should be updated, as described above. Additionally or alternatively, the model monitor 128 or the monitoring and observability service 116 can send S420 a notification to the user about the event, as described above.

Figure 6:
FIG. 6 is a schematic of retraining the target model.
Figure 6:
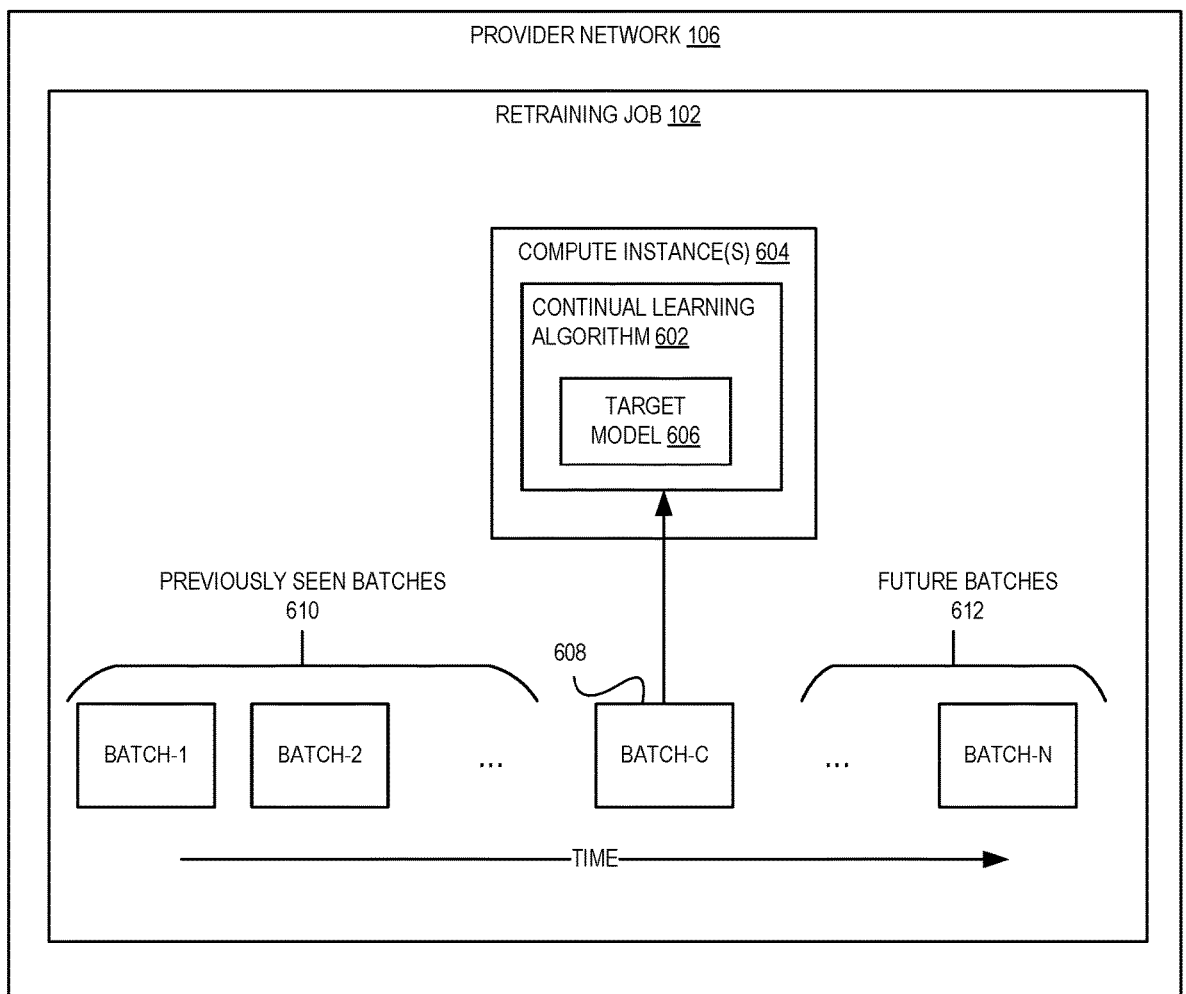

The method 200 can include the step of retraining the target model. As shown in FIG. 6, a continual learning algorithm 602 can be executed on a set of one or more compute instances 604 in the provider network 106. The one or more computer instances 604 can be one or more virtual machines, one or more containers, or one or more electronic devices. The continual learning algorithm 602 is executed to retrain the target model 606 based on a current batch 608 of a training data 132 in a sequence of training data 132 batches. Prior versions of the target model may have been retrained on previously seen training data 132 batches 610 in sequence. Future versions of the target model may be retrained on as of yet unseen training data 132 batches 612 in the sequence.

For each version of the target model retrained on the current batch 608 in the sequence, a goal of the continual learning algorithm can be to reduce, mitigate, or avoid catastrophic forgetting and doing so with relying on access to the previously seen training data 132 batches 610 when retraining the target model on the current batch 608. While in some examples the target model 606 is retrained based on the current batch 608 without reliance on previously seen training data 132 batches 610, target model 606 is retrained based on some or all of the training data 132 of previously seen batches 610. How much of the previously seen batches 610 that are used for retraining based on the current batch 608 can be selected according to various factors and according to the requirements of the particular implementation at hand. Such selection factors may include the size (e.g., in bytes) of the trained data 132 in the previously seen batches 610 and an upper bound on the training time for the current batch 608, among other possible factors.

To reduce or eliminate catastrophic forgetting, the continual learning algorithm 602 may employ various different strategies including all or all of: replay strategies, regularization-based methods, or parameter isolation methods. Replay strategies that may be used include any or all of: rehearsal methods (e.g., iCaRL, ER, SER, TEM, CoPE), pseudo rehearsal methods (e.g., DGR, PR, CCLUGM, LGM), or constrained methods (e.g., GEM, A-GEM, GSS). Regularization-based methods that may be used include any or all of: prior-focused methods (e.g., EWC, IMM, SI, R-EWC, MAS, Reimannian Walk) or data-focused methods (e.g., LwF, LFL, EBLL, DMC). Parameter isolation methods that may be used include fixed network methods (e.g., PackNet, PathNet, Piggyback, HAT) or dynamic architectures (e.g., PNN, Expert Gate, RCL, DAN).

The method 200 can include the step of tuning S220 hyperparameters. Here, hyperparameters can include model hyperparameters as well as algorithm hyperparameters such as for example hyperparameters of a continual learning algorithm. Hyperparameter tuning can encompass finding the best version of the updated model 108 by running multiple retraining jobs 102 on a set of training data 132 according to a hyperparameter optimization algorithm and within ranges of specified or predetermined hyperparameters. The tuning job 104 then selects hyperparameter values that result in the updated model 108 that performs the best according to a set of one or more performance metrics (e.g., area under the curve (auc)). For example, assume the target model is trained according to a gradient boosted tree algorithm (e.g., XGBoost). A goal of the tuning job 104 can be to maximize the area under the curve (auc) metric of the hyperparameter optimization algorithm by launching multiple retraining jobs 102 that use different sets of hyperparameter values in the specified or predetermined ranges and returning the retraining job with the highest auc.

With random search 702, tuning S220 hyperparameters includes choosing a random combination of values from within the specified or predetermined hyperparameter ranges for each retraining job 702 launched. Because the choice of hyperparameter values does not depend on the results of previous retraining jobs 102, a maximum number of concurrent retraining jobs 102 can be executed without affecting the performance of the tuning S220.

Bayesian optimization 704 treats tuning S220 like a regression problem. Given a set of hyperparameters, tunning S220 based on Bayesian optimization 704 optimizes the updated model 108 for a selected metric. To solve a regression problem, tunning S220 can make guesses about which hyperparameter combinations are likely to provide the best results. Multiple retraining jobs 102 can be run test the different guesses of hyperparameter combinations. After testing a set of hyperparameter values with a retraining job 102, tuning S220 can use regression to choose the next set of hyperparameter values to test. For example, tuning S220 can use a Bayesian optimization implementation.

When choosing the best set of hyperparameter values for the next retraining job 102, the Bayesian optimization implementation of tuning S220 can consider everything that is known about the regression problem so far. For example, tuning S220 can choose a combination of hyperparameter values close to the combination that resulted in the best previous retraining job 102 to incrementally improve performance. This allows tuning S220 to exploit the best know results. As another example, tuning S220 can choose a set of hyperparameter values far removed from those already tried. This allows tuning S220 to explore the range of hyperparameter values to try to find new areas that are not yet well understood.

Hyperband 706 is a multi-fidelity based tuning strategy. Hyperband 706 can dynamically reallocate resources. Hyperband 706 can use both intermediate and final results of retraining jobs 102 to re-allocate epochs to well-utilized hyperparameter configurations. Hyperband 706 can automatically stop those retraining jobs 102 that underperform. Hyperband 706 also has the benefit that the retraining jobs 102 can be executed in parallel. This can significantly speed up tuning S220 over the random search and Bayesian strategies discussed above.

With hyperband with early stopping 708, hyperband 706 tuning S220 is used. However, retraining jobs 102 that are unlikely to improve the objective metric of the tuning S220 job are stopped before they complete. This can help both reduce compute and avoid overfitting the updated model 108.

Figure 7:
FIG. 7 is a schematic of tuning hyperparameters for the target model.
Figure 7:
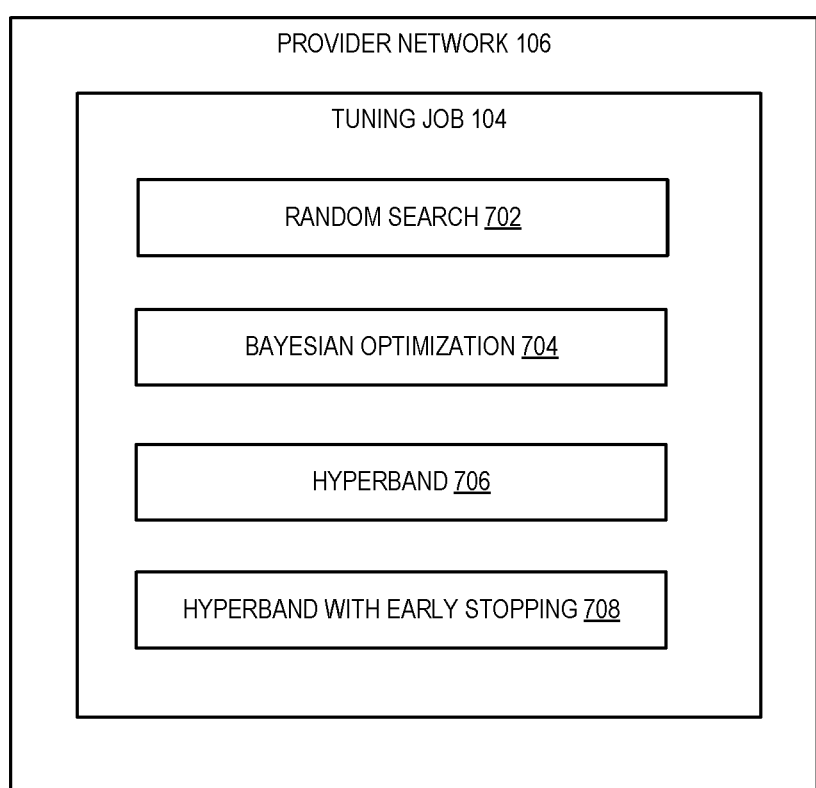

As shown in FIG. 7, various different hyperparameter optimization algorithms can be executed by the tuning step 104 to performing tuning S220 of hyperparameters including any of all of: random search 702, Bayesian optimization 704, hyperband 706, hyperband with early stopping 708, or other suitable hyperparameter optimization algorithm. Exploring all possible hyperparameter combinations is impractical. Tuning S220 of hyperparameters can accelerate productivity by trying multiple different variations of the updated model 108. Tuning S220 can look for the best updated model 108 automatically by focusing on the most promising combinations of hyperparameter values with specified or predetermined hyperparameter ranges.

The method 200 can optionally include the step of registering S222 the updated model 108 in the model registry 124. Execution of the retraining step 102 or the tuning step 104 yields the updated model 108 with any or all of: new or updated model parameters (weights), new or updated hyperparameters, or new or updated neural architecture (e.g., new layers or removed layers). Model artifacts representing the updated model 108 can be registered S222 in the model registry 124 as a new version of the target model.

The method 200 can optionally include the step of deploying S224 the updated model 108 to the inference endpoint 126 (or another inference endpoint in the provider network 106). The updated model 108 can be used at the inference endpoint 126 to generate inferences. For example, the updated model 108 along with an inference algorithm can be hosted and executed in one or more virtual machines, one or more containers, or one or more electronic devices in the provider network 106. The inference endpoint 126 can be one of several different possible inference endpoint types. One type of inference endpoint is a real-time inference endpoint. A real-time inference endpoint can be used for continuous or near continuous, real-time, interactive, low-latency inferences or predictions generated by the updated model 108. Another type of inference endpoint is a "serverless" inference endpoint. A serverless inference endpoint is well suited for inference workloads that have idle periods between traffic spurts and that can tolerate cold starts. Another type of inference endpoint is an asynchronous inference endpoint. An asynchronous inference endpoint queues inference requests and processes them asynchronously against the updated model 108 and is well suited for inference requests with large request payloads (e.g., up to 1 GB), long processing times (up to 15 minutes), and near real-time latency requirements. Another type of inference endpoint is a batch transform inference endpoint. A batch transform inference endpoint is useful to preprocess datasets to remove noise or bias that interferes with inference, to get inferences from large datasets, to run inference when a persistent inference endpoint is not required, or to associate input records with inferences to assist the interpretation of results.

5. Provider Network Environment

Figure 8:
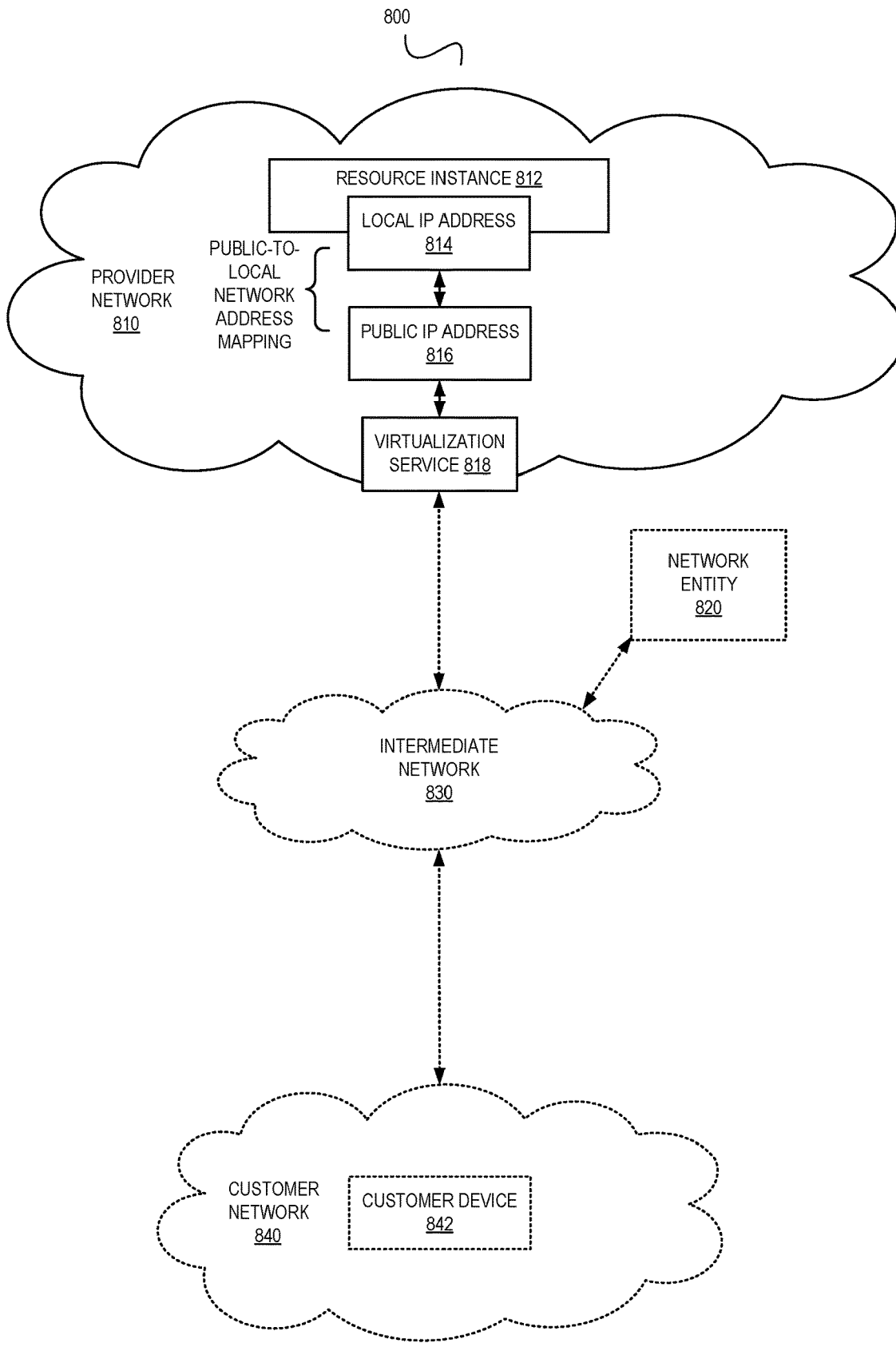
FIG. 8 illustrates a provider network environment in which the techniques disclosed herein can be implemented, according to some examples.

FIG. 8 illustrates a provider network environment 800 in which the techniques disclosed herein can be implemented, according to some examples. The environment 800 includes a provider network 810 and optionally an intermediate network 830 and a customer network 840. The provider network 810 can provide resource virtualization to a customer of provider network via a virtualization service 818. The virtualization service 818 can allow the customer to purchase, rent, subscribe to, or otherwise obtain use of one or more resource instances (e.g., resource instance 812).

A resource instance can include, but is not limited to, a compute, storage, or network resource. The resource instance can be implemented by an electronic device in a datacenter within the provider network. The datacenter can be a physical facility or building that houses compute, storage, and network infrastructure. The provider network 810 can encompass many resource instances implemented by many electronic devices distributed over a set of datacenters located in different geographic regions or locations. An example of an electronic device is device 900 described below with respect to FIG. 9.

Examples of a resource instance include a virtual machine (VM) and a container. A virtual machine can be a compute resource that uses software instead of a physical computer to run a program and deploy an application. A virtual machine (sometimes called a "guest") can run on a single physical machine (sometimes called the "host"). A virtual machine can execute its own operating system (e.g., UNIX, WINDOWS, LINUX, etc.) and can function separately from other virtual machines, including those on the same host. A virtual machine can be a substitute for a physical machine. A host's physical resources can be shared between multiple virtual machines each running its own copy of an operating system. Access to and use of the host's physical resources (e.g., hardware processor and physical memory resources) by the multiple virtual machines is coordinated by a virtual machine monitor (sometimes called a "hypervisor"). The hypervisor itself can run on the bare hardware of the host or as a process of an operating system that runs on the bare hardware.

A container is like a virtual machine with respect to running separate applications on a single platform. However, a container typically packages a single application along with its runtime dependencies and libraries, while a virtual machine virtualizes the hardware to create a "computer." Another difference is that a container system typically provides the services of an operating system kernel that runs on the bare hardware of the underlying host to containers that share the kernel services as orchestrated by the container system. The container system itself runs on the host with the aid of the operating system kernel and isolates the containers from each other to a certain degree. While a container can be used independently of a virtual machine, a container and a virtual machine can be used together. For example, a container can run on an operating system that runs on a virtual machine.

Within the provider network 810, a local Internet Protocol (IP) address 814 can be associated with a resource instance 812. The local IP address 814 can include an internal or private network address in the provider network 810. The local IP address 814 can be an IPv4 or IPv6 address, for example. For example, the local IP address 814 can be one reserved by Internet Engineering Task Force (IETF) Request for Comments (RFC) 1918 or having an address format specified by IETF RFC 4193 and can be mutable within the provider network 810.

Network traffic originating outside the provider network 810—e.g., from a network entity 820 coupled to the intermediate network 830 or a customer device 842 in the customer network 840—that is destined for a resource instance 812 in the provider network 810 typically is not directly routed to a local IP address 814. Instead, the network traffic is addressed to a public IP address 816. The public IP address 816 is mapped by the provider network 810 to the local IP address 814 using network address translation (NAT) or similar technology.

Using a customer device 842 in the customer network 840, the customer can use, control, operate, or benefit from the virtualization service 818, a resource instance 812, a local IP address 814, and a public IP address 816 to implement a customer-specific application and offer the application to one or more network entities (e.g., network entity 820) on the intermediate network 830 such as, for example, the Internet. A network entity 820 can then generate network traffic destined for the application by addressing the network traffic for the public IP address 816. The traffic can then be routed via the intermediate network 830 to the datacenter of the provider network 810 which houses the electronic device that implements the resource instance 812. Within the data center, the traffic can be routed to the local IP address 814 where the traffic is received and processed by the resource instance 812. Response network traffic from the resource instance 812 can be routed back onto the intermediate network 830 to the network entity 820.

6. Electronic Device

Figure 9:
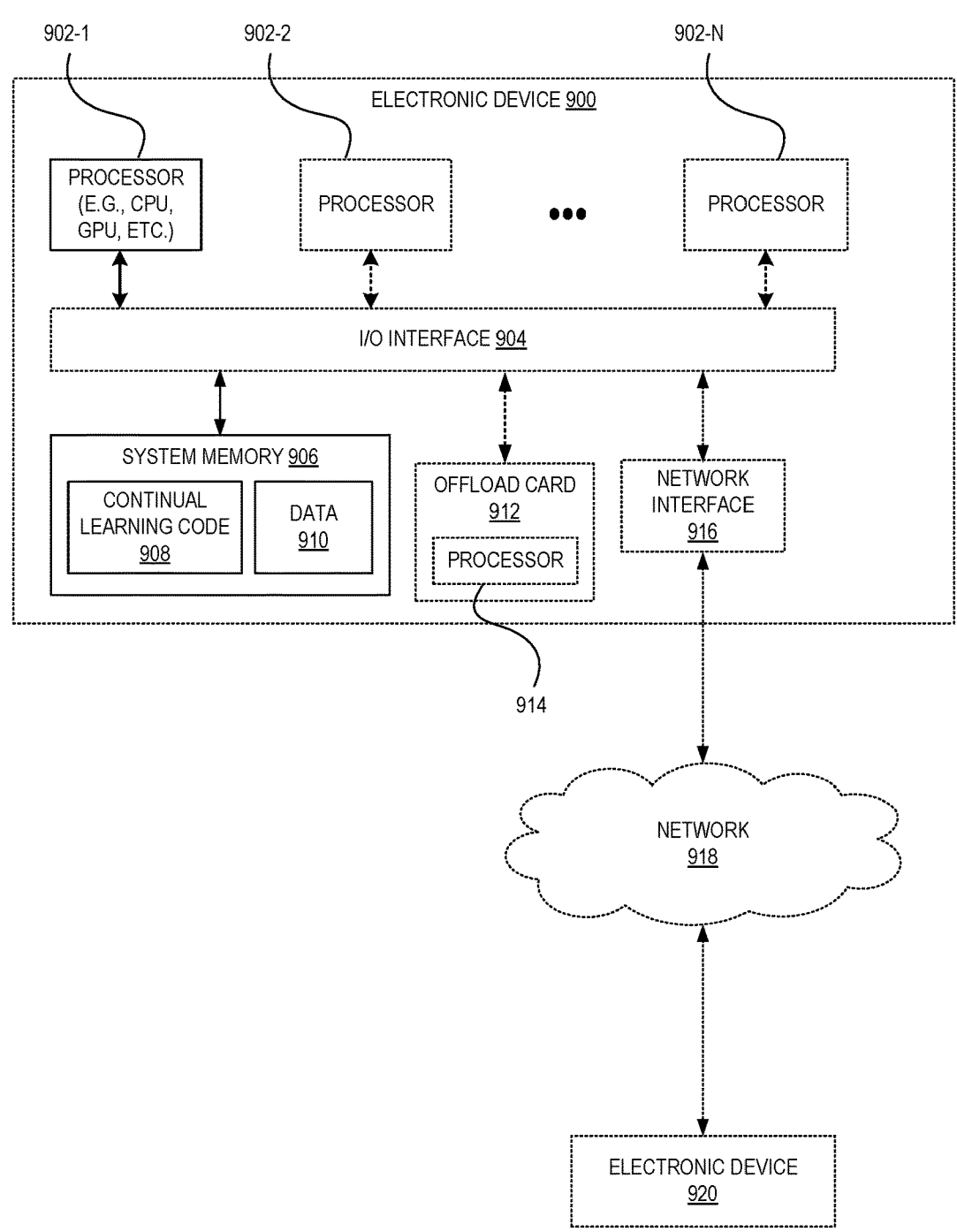
FIG. 9 illustrates an electronic device that can be used in an implementation of the techniques disclosed herein, according to some examples.

FIG. 9 illustrates electronic device 900 that can be used in an implementation of the techniques disclosed herein, according to some examples. Device 900 can include a set of one or more processors 902-1, 902-2, . . . , 902-N coupled to system memory 906 via an input/output (I/O) interface 904. The device 900 can further include a network interface 916 coupled to the I/O interface 904.

The device 900 can be a uniprocessor system including one processor or can be a multiprocessor system including multiple processors. Each of processors 902-1, 902-2, . . . , 902-N can be any suitable processor capable of executing instructions. For example, each of the processors 902-1, 902-2, . . . , 902-N can be general-purpose or embedded processor implementing any of a variety of instruction set architectures (ISAs), such as the X86, ARM, POWERPC, SPARC, or MIPS ISAs, or any other suitable ISA.

The system memory 906 can store instructions and data accessible by the processor(s) 902-1, 902-2, . . . , 902-N. The system memory 906 can be implemented using any suitable memory technology, such as random-access memory (RAM), static RAM (SRAM), synchronous dynamic RAM (SDRAM), nonvolatile or Flash-type memory, or any other type of memory. Program instructions 908 and data 910 implementing a desired function, such as a method, process, act, or operation of the techniques disclosed herein, are stored within the system memory 906 as code 908 (e.g., executable to implement, in whole or in part, a method, process, act, or operation performed by retraining job 102 or tuning job 104 of FIG. 1) and data 910.

The I/O interface 1S04 can be configured to coordinate I/O traffic between the processor(s) 902-1, 902-2, . . . , 902-N, the system memory 906, and any peripheral devices in device 900, including, optionally, a network interface 916 or other peripheral interfaces (not shown). The I/O interface 1S04 can perform any necessary protocol, timing, or other data transformations to convert data signals from one component (e.g., the system memory) into a format suitable for use by another component (e.g., the processor(s) 902-1, 902-2, . . . , 902-N).

The I/O interface 904 can include support for devices attached through various types of peripheral buses, such as a variant of the PERIPHERAL COMPONENT INTERCONNECT (PCI) bus standard or the UNIVERSAL SERIAL BUS (USB) standard, for example (e.g., a bus implementing a version of the PERIPHERAL COMPONENT INTERCONNECT— EXPRESS (PCI-E) standard, or another interconnect such as a QUICKPATH INTERCONNECT (QPI) or ULTRAPATH INTERCONNECT (UPI)). The function of the I/O interface 904 can be split into two or more separate components, such as a north bridge and a south bridge, for example. Also, some of the functionality of the I/O interface 904, such as an interface to the system memory 906, can be incorporated directly into the processor(s) 902-1, 902-2, . . . , 902-N.

An optional network interface 916 can be configured to allow data to be exchanged between device 900 and another electronic device 920 attached to device 900 via a network 918. The network interface 916 can support communication via any suitable wired or wireless networks, such as a type of wired or wireless Ethernet network, for example. Additionally, the network interface 916 can support communication via telecommunications or telephony networks, such as analog voice networks or digital fiber communications networks, via storage area networks (SANs), such as FIBRE CHANNEL SANs, or via any other suitable type of network or protocol.

The device 900 can optionally include an offload card 912 including a processor 914, and possibly including a network interface (not depicted), that is connected using the I/O interface 904. For example, device 900 can act as a host electronic device (e.g., operating as part of a hardware virtualization service) that hosts compute resources such as compute instances, and the offload card 912 can execute a virtualization manager that can manage compute instances that execute on the host electronic device 900. As an example, the offload card 912 can perform compute instance management operations, such as pausing or un-pausing compute instances, launching or terminating compute instances, performing memory transfer/copying operations, etc. These management operations can be performed by the offload card in coordination with a hypervisor (e.g., upon a request from a hypervisor) that is executed by the processor(s) 902-1, 902-2, . . . , 902-N of device 900. However, the virtualization manager implemented by the offload card 912 can accommodate requests from other entities (e.g., from compute instances themselves).

The system memory 906 can encompass one or more computer-accessible media configured to store program instructions 908 and data 910. However, program instructions 908 or data 910 can be received, sent, or stored upon different types of computer-accessible media. Computer-accessible media includes non-transitory computer-accessible media and computer-accessible transmission media. Examples of non-transitory computer-accessible media include volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD). Other examples of non-volatile computer-accessible media include read-only memory (ROM), erasable programmable ROM (EPROM), electrically erasable programmable ROM (EEPROM), ferroelectric RAM, and other computer data storage devices (e.g., disk storage, hard disks drives, optical discs, floppy disks, and magnetic tape).

7. Extensions and Alternatives

Embodiments of the system or method can include every combination and permutation of the various system components and the various method processes, wherein one or more instances of the method or processes described herein can be performed asynchronously (e.g., sequentially), concurrently (e.g., in parallel), or in any other suitable order by or using one or more instances of the systems, elements, or entities described herein.

Ordinal terms such as first, second, etc. may be used in the foregoing description and in the appended claims to describe various elements, features, acts, or operations. Unless the context clearly indicates otherwise, such elements, features, acts, or operations are not limited by those terms. The terms are used only to distinguish one element, feature, act, or operation from another. For example, a first device could be termed a second device. The first device and the second device are both devices, but they are not the same device.

Unless the context clearly indicates otherwise, as used in the foregoing description and in the appended claims, the singular forms "a," "an," and "the" are intended to include the plural forms as well.

Unless the context clearly indicates otherwise, as used in the foregoing description and in the appended claims, the terms "comprising," "including," "having," "based on," "encompassing," and other like terms, are used in the foregoing description and in the appended claims in an open-ended fashion, and do not exclude additional elements, features, acts, or operations.

In the case of "based on," the term is used in the foregoing description and in the appended claims in some instances to identify a causal relationship between stated steps, acts or operations. Unless the context clearly indicates otherwise, "A based on B" in these instances means that the performance of step, act, or operation B causes the performance of step, act, or operation A. The causal relationship can be direct (via no intermediate steps, acts, or operations) or indirect (via the performance of one or more intermediate steps, acts, or operations). However, unless the context clearly indicates otherwise, the term "A based on B" is not intended to require the performance of B be necessary in all cases to cause the performance of A, and A may be performed in some cases without being caused by the performance of B. In those cases, however, A would not be based on B even though A is based on B in other cases. Further, unless the context clearly indicates otherwise, the term "A based on B" is not intended to require that the performance of B by itself be sufficient in all cases to cause the performance of A, and one or more other steps, acts, or operations in addition to B may be performed in some cases to cause the performance of A. In such circumstances, A can still be based on B even though multiple steps, acts, or operations including B are performed to cause A.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

As a person skilled in the art will recognize from the previous detailed description and from the figures and claims, modifications and changes can be made to the examples of the techniques without departing from the scope of the invention defined in the following claims.

What is claimed is:

1. A method for continual learning in a provider network, the method comprising:

registering a pre-trained target machine learning model in a model registry in the provider network;

sending a model updating signal from the provider network;

receiving, at the provider network, a command to trigger a model updating pipeline;

performing, by the model updating pipeline implemented as code executing on one or more processors in the provider network, a hyperparameter tuning job and a plurality of machine learning model retraining jobs to yield a plurality of updated machine learning models;

selecting, by the model updating pipeline implemented as code executing on the one or more processors, one of the plurality of updated machine learning models as an updated machine learning model according to a machine learning model performance metric computed for each machine learning model retraining job of the plurality of machine learning model retraining jobs;

registering the updated machine learning model in the model registry; and deploying the updated machine learning model to an inference endpoint in the provider network.

2. The method of claim 1, wherein performing each machine learning model retraining job of the plurality of machine learning model retraining jobs comprises executing a continual learning algorithm as part of the machine learning model retraining job.

3. A method comprising:

sending a model updating signal pertaining to a pre-trained target machine learning model;

receiving a command to trigger a model updating pipeline for the pre-trained target machine learning model;

performing, by the model updating pipeline implemented as code executing on one or more processors, a hyperparameter tuning job and a plurality of machine learning model retraining jobs to yield a plurality of updated machine learning models, each machine learning model retraining job of the plurality of machine learning model retraining jobs performed using a different set of hyperparameter values; and selecting, by the model updating pipeline implemented as code executing on the one or more processors, one of the plurality of updated machine learning models as an updated machine learning model according to a machine learning model performance metric computed for each machine learning model retraining job of the plurality of machine learning model retraining jobs.

4. The method of claim 3, further comprising:

registering the updated machine learning model in a model registry; and deploying the updated machine learning model to an inference endpoint.

5. The method of claim 3, wherein performing each machine learning model retraining job of the plurality of machine learning model retraining jobs comprises executing a continual learning algorithm as part of the machine learning model retraining job.

6. The method of claim 3, wherein sending the model updating signal pertaining to the pre-trained target machine learning model is based on detecting an event indicating that the pre-trained target machine learning model should be updated.

7. The method of claim 6, wherein detecting the event indicating that the pre-trained target model should be updated comprises determining that a data quality metric for the pre-trained target model does not meet a threshold.

8. The method of claim 6, wherein detecting the event indicating that the pre-trained target model should be updated comprises determining that a model quality metric for the pre-trained target model does not meet a threshold.

9. The method of claim 6, wherein detecting the event indicating that the pre-trained target model should be updated comprises determining that a bias metric for the pre-trained target model does not meet a threshold.

10. The method of claim 6, wherein detecting the event indicating that the pre-trained target model should be updated comprises determining that a feature attribution metric for the pre-trained target model does not meet a threshold.

11. The method of claim 3, wherein the pre-trained target model is a deep artificial neural network model.

12. The method of claim 3, wherein the model updating pipeline comprises a processing step, a tuning step, and one or more retraining steps.

13. A system comprising:

one or more electronic devices to implement a machine learning service in a provider network, the machine learning service comprising instructions which when executed cause the machine learning service to:

receive a command to trigger a model updating pipeline for a pre-trained target model;

perform, by the model updating pipeline implemented as code executing on one or more processors, a hyperparameter tuning job and a plurality of machine learning model retraining jobs as part of an execution of the model updating pipeline to yield a plurality of updated machine learning models;

select, by the model updating pipeline implemented as code executing on the one or more processors, one of the plurality of updated machine learning models as an updated machine learning model according to a machine learning model performance metric computed for each machine learning model retraining job of the plurality of machine learning model retraining jobs;

register the updated machine learning model in a model registry in the provider network; and deploy the updated machine learning model to an inference endpoint in the provider network.

14. The system of claim 13, wherein the machine learning service further comprises instructions which when executed cause the machine learning service to execute a continual learning algorithm based on a batch of training data in a sequence of a plurality of training data batches to yield the updated machine learning model.

15. The system of claim 14, further comprising one or more electronic devices to implement a model monitoring service for monitoring the pre-trained target model deployed at the inference endpoint, the model monitoring service comprising instructions which when executed cause the model monitoring service to detect an event indicating that the pre-trained target model should be updated.

16. The system of claim 15, wherein the event comprises a metric exceeding or falling below a threshold.

17. The system of claim 16, wherein the metric pertains to data quality, model quality, bias, or feature attribution of the pre-trained target model.

18. The system of claim 13, wherein the pre-trained target model is a deep artificial neural network model.

19. The system of claim 13, wherein the model updating pipeline comprises a processing step, a tuning step, and one or more retraining steps.

* * * * *